(12) United States Patent
Newman

(10) Patent No.: US 10,502,318 B2
(45) Date of Patent: Dec. 10, 2019

(54) REMOTE LOCKING SYSTEM FOR AN AUTONOMOUS VEHICLE

(71) Applicant: NextEV USA, Inc., San Jose, CA (US)

(72) Inventor: Austin Newman, San Jose, CA (US)

(73) Assignee: NIO USA, Inc., San Jose, CA (US)

( * ) Notice: Subject to any disclaimer, the term of this patent is extended or adjusted under 35 U.S.C. 154(b) by 180 days.

(21) Appl. No.: 15/396,594

(22) Filed: Dec. 31, 2016

(65) Prior Publication Data

US 2018/0149267 A1 May 31, 2018

Related U.S. Application Data

(60) Provisional application No. 62/427,248, filed on Nov. 29, 2016.

(51) Int. Cl.
*F16H 63/34* (2006.01)

(52) U.S. Cl.
CPC ..... *F16H 63/3491* (2013.01); *F16H 63/3441* (2013.01); *F16H 63/3458* (2013.01); *F16H 63/3425* (2013.01)

(58) Field of Classification Search
CPC ............. F16H 63/3491; F16H 63/3458; F16H 63/3425
See application file for complete search history.

(56) References Cited

U.S. PATENT DOCUMENTS

| | | | | |
|---|---|---|---|---|
| 2,992,693 A * | 7/1961 | Peyton | ............... | B60K 17/06 180/281 |
| 4,067,411 A * | 1/1978 | Conley | ............... | B60R 25/04 180/169 |
| 5,293,527 A * | 3/1994 | Sutton | ............... | F41H 13/0093 180/167 |
| 5,611,408 A * | 3/1997 | Abukhader | ............... | E01F 13/12 180/287 |
| 5,952,600 A * | 9/1999 | Herr | ............... | F41B 15/04 361/213 |
| 6,723,225 B2 * | 4/2004 | Scheps | ............... | B60R 25/04 180/279 |
| 7,049,709 B2 * | 5/2006 | Boggs | ............... | B60R 25/04 307/10.2 |
| 7,215,237 B1 * | 5/2007 | Messerschmid | ........ | B60R 25/04 340/426.11 |
| 7,475,624 B1 * | 1/2009 | Daily | ............... | B60L 1/00 180/167 |
| 8,602,176 B2 * | 12/2013 | Khuu | ............... | B60B 33/0039 188/1.12 |

OTHER PUBLICATIONS

WO2018/042264 (Year: 2016).*

* cited by examiner

*Primary Examiner* — Alan D Hutchinson
(74) *Attorney, Agent, or Firm* — Sheridan Ross P.C.

(57) ABSTRACT

A remote locking system for an autonomous vehicle is disclosed. The locking system has a locking mechanism operably connected to an axle of the vehicle. The locking mechanism is selectively actuatable to prevent a power system from rotating the axle. The locking system also has a control station connected to the locking mechanism through a wireless network. The control station is configured to remotely actuate the locking mechanism. The power system is autonomously controlled by an electronic control system and the locking mechanism is independent from the electronic control system.

12 Claims, 4 Drawing Sheets

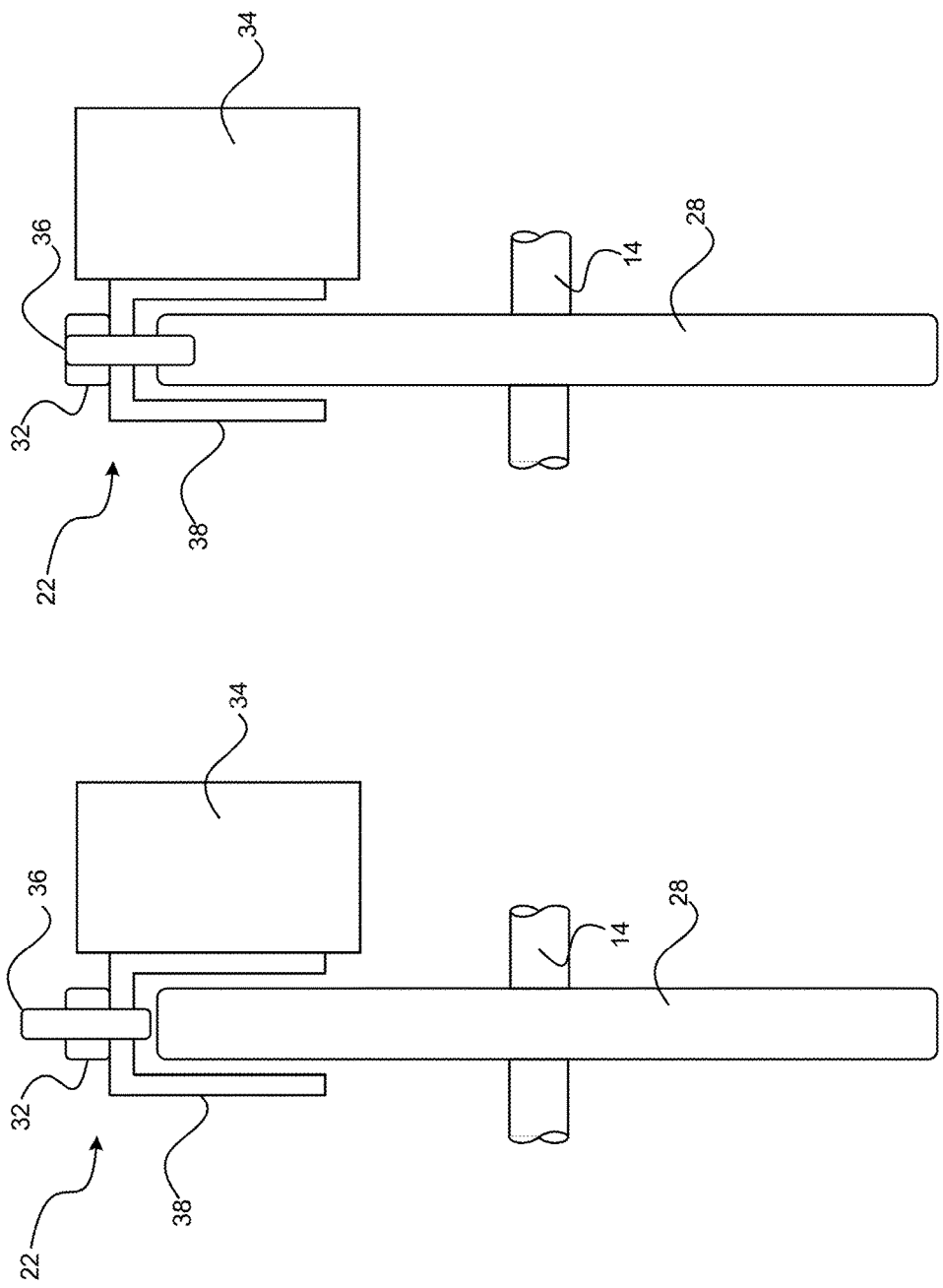

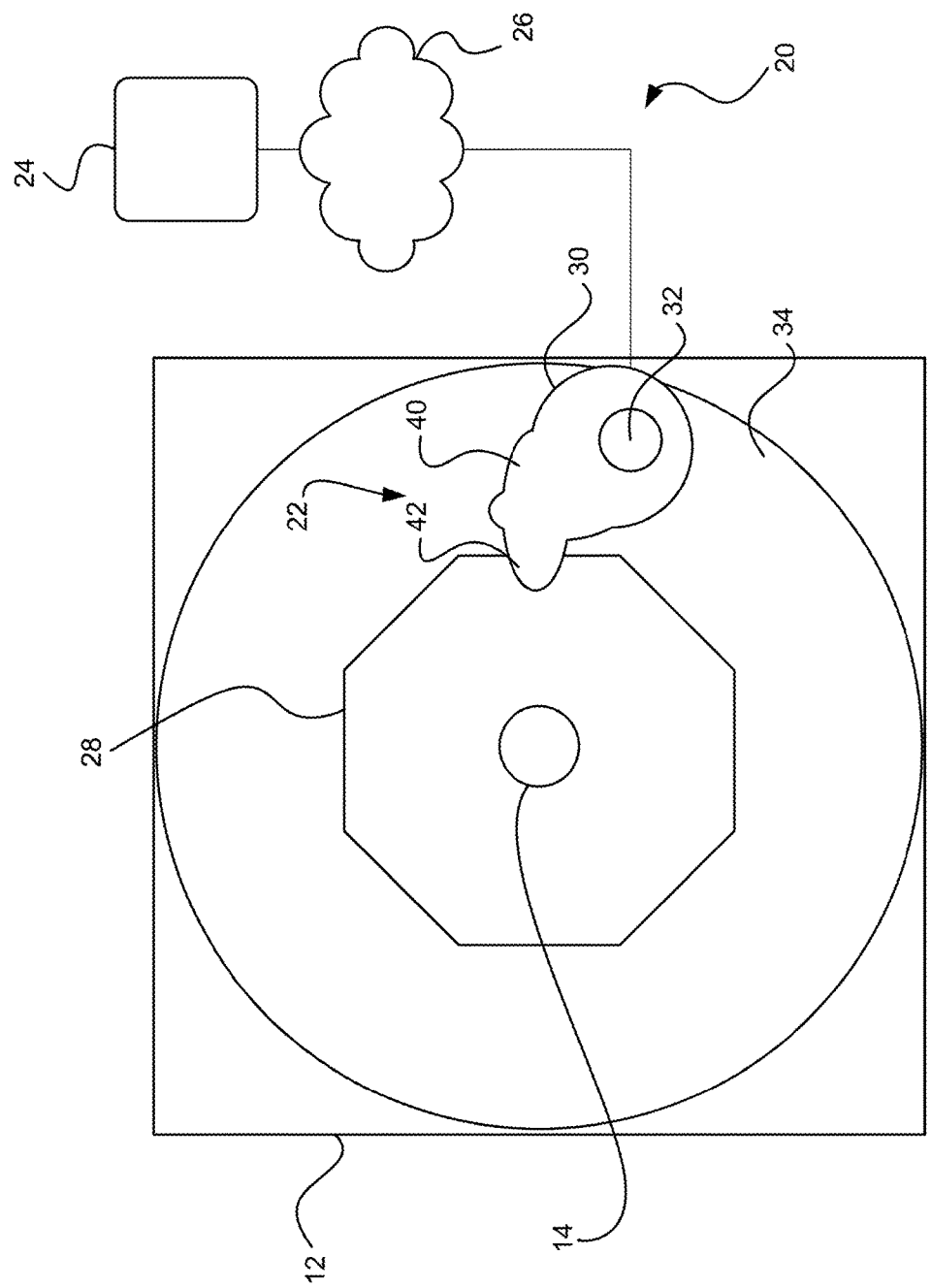

REMOTE LOCKING SYSTEM FOR AN AUTONOMOUS VEHICLE

PRIORITY CLAIM

This application claims priority under 35 U.S.C. § 119 to U.S. Provisional Application No. 62/427,248, filed on Nov. 29, 2016 which is expressly incorporated by reference herein in its entirety.

FIELD OF INVENTION

The present disclosure relates to a remote locking system, and, in particular, to a remote locking system for stopping an autonomous vehicle which is independent and separate from an electronic control system of the vehicle.

BACKGROUND

Autonomous vehicle technology is continuously advancing. Eventually, many of the vehicles traveling on the roads will be partially or fully automated. While this automation will be beneficial in many ways, it removes an element of control associated with conventional, manually-driven vehicles. In particular, because autonomous vehicles will be primarily driven by computing devices executing software, the possibility of a "runaway" or erroneously-controlled vehicle becomes a potential problem. Issues such as software bugs, forced third-party control, and malfunctioning components may result in a vehicle moving around in an unwanted and/or unpredictable manner. While some current vehicles have remotely-controllable systems which may be used for stopping, these systems are integrated into the electronic control unit and can be overridden or otherwise overcome. Thus, there is a need for an independently controllable system for stopping a runaway vehicle.

SUMMARY

In one aspect, the present disclosure is directed to a locking system for a vehicle. The locking system includes a locking mechanism operably connected to an axle of the vehicle. The locking mechanism is selectively actuatable to prevent a power system from rotating the axle. The locking system also includes a control station connected to the locking mechanism through a wireless network. The control station is configured to remotely actuate the locking mechanism. The power system is autonomously controlled by an electronic control system and the locking mechanism is independent from the electronic control system.

In another aspect, the present disclosure is directed to a locking system for a vehicle. The locking system includes a locking mechanism mounted on a rotating member attached to an axle of the vehicle. The locking mechanism is selectively actuatable to prevent a power system from rotating the axle. The locking system further includes a control station connected to the locking mechanism through a wireless network and configured to remotely actuate the locking mechanism. The locking mechanism includes a control unit and a mechanical stop. The control unit is configured to selectively actuate the mechanical stop to prevent rotation of the axle. The mechanical stop deforms the rotating member when actuated.

In yet another aspect, the present disclosure is directed to a vehicle. The vehicle includes a power system including at least one of an engine or a motor configured to rotate an axle and at least one traction device operably connected to be rotated by rotation of the axle. The vehicle also includes an electronic control system configured to control the power system to autonomously drive the vehicle. The vehicle also includes a locking system. The locking system includes a locking mechanism operably connected to the axle and being selectively actuatable to prevent the power system from rotating the axle. The power system is autonomously controlled by the electronic control system and the locking mechanism is independent from the electronic control system.

BRIEF DESCRIPTION OF THE DRAWING(S)

FIG. 3A is a side-view illustration of a locking mechanism in an unlocked position;

FIG. 3B is a side-view illustration of the locking mechanism of FIG. 3B in a locked position; and FIG. 4 is a schematic illustration of the remote locking system including a locking mechanism according to another embodiment.

DETAILED DESCRIPTION OF THE PREFERRED EMBODIMENT(S)

As vehicles become increasingly autonomous and self-driven, there may be faults. One of those outcomes could be a runaway car which cannot be controlled by software. In an exemplary embodiment, a drivetrain mechanical stop running on separate electrical hardware can be used like an emergency brake but in a manner that it will stop and disable the vehicle until the stopping device is physically disengaged. In alternative embodiments, the mechanical stop could be used as theft prevention or intervention tool by a police force.

The present disclosure relates to a locking system for an autonomous vehicle. The locking system may include a device capable of locking a transmission or other vehicle component such that the vehicle is stopped and/or prevented from moving. In an exemplary embodiment, the locking system is controllable through a communication path separate from the autonomous control system to help protect against it being overridden. The locking system may be remotely controllable through a wireless network connection, thereby allowing a control station to transmit a command to stop a runaway vehicle. In some embodiments, the locking mechanism is configured to deform a component of the vehicle such that a locking process is not easily reversible.

Figure 1:
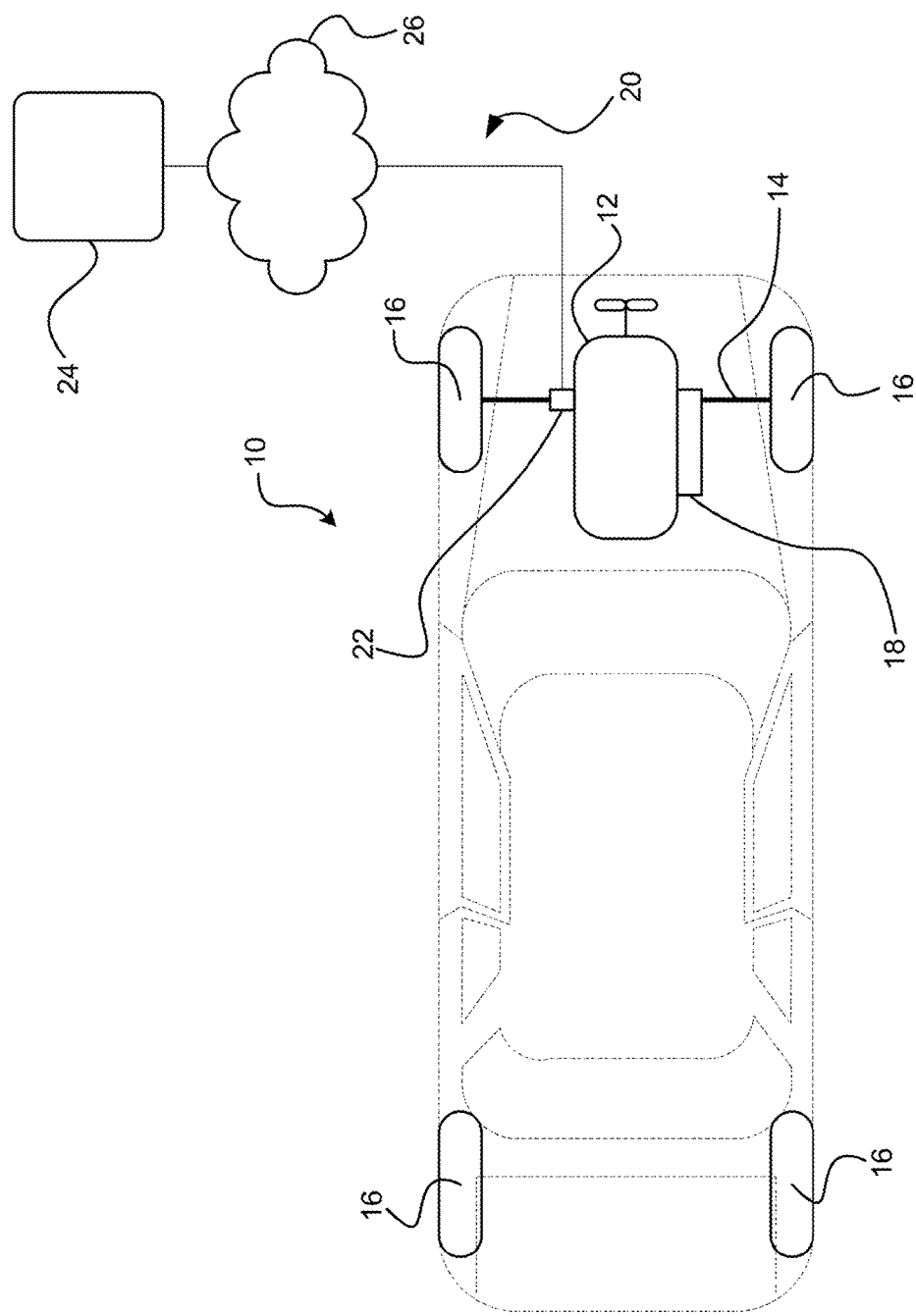
FIG. 1 is a schematic top-view illustration of an exemplary vehicle.

FIG. 1 illustrates an exemplary embodiment of a vehicle 10. The vehicle 10 may be any type of vehicle, such as a car, truck, taxi, etc. The vehicle 10 preferably includes a power system 12. The power system 12 may be any type of motion-producing device, such as an internal combustion engine, an electric motor for an electric vehicle, a hybrid engine, etc. The power system 12 is preferably configured to transmit motion to an axle 14 which causes rotation of one or more traction devices 16.

As used herein, the axle 14 may refer to any rotating mechanical link between the power system 12 and at least one traction device 16. For example, the axle 14 may be a front or rear drive axle, a driveshaft, an internal motor or engine shaft, or any other rotating shaft connected to the power system 12 and which at least contributes to the rotation of at least one traction device 16.

In an exemplary embodiment, the vehicle 10 further includes an electronic control system 18 operably connected to the power system 12. The electronic control system 18 may include a processing device, memory, etc., and be configured to control one or more systems of the vehicle 10. These systems may include the power system 12, a steering system, a braking system, etc.

The electronic control system 18 may be a component of an autonomous control system configured to control at least one aspect of the motion of the vehicle 10. For instance, the electronic control system 18 may execute software to autonomously drive the vehicle 10 on the road, including making decisions regarding speed, route, lane, turning, etc.

It may be possible for electronic control system 18 to control the vehicle 10 in an undesirable manner, such as through a computing error, component malfunction, or overriding of the control system by a third-party. Vehicle 10 further includes a locking system 20 which is configured to stop the vehicle 10 and/or prevent further movement of the vehicle 10.

The locking system 20 includes a locking mechanism 22. In an exemplary embodiment, the locking mechanism 22 is connected to the axle 14 and is capable of locking the axle 14 or other component of the power system 12 such that vehicle 10 is stopped and/or prevented from further movement. The locking mechanism 22 is preferably independent from the electronic control system 18 such that it is not effected by a malfunction or overriding of the electronic control system 18. The locking mechanism 22 is independent from the electronic control system 18 in that the electronic control system 18 cannot control the locking mechanism 22. There is preferably no electrical connection or communication path between the locking mechanism 22 and the electronic control system 18.

In one embodiment, the locking system 20 further includes a control station 24 connected to the locking mechanism 22 via a network 26. The connection between the locking mechanism 22 and the control station 24 may be wireless such that the control station 24 may remotely control the locking mechanism 22. In another embodiment, the connection may be wired or wireless with the control station 24 being located within the vehicle 10 (and thus operable by a driver/passenger). In an exemplary embodiment, the control station 24 is a computing device including a processor and a memory. The control station 24 may be, for example, a computer, server, mobile device, etc. The control station 24 is configured to communicate with the locking mechanism 22 in order to transmit a signal to cause the locking mechanism 22 to stop the vehicle 10.

Figure 2:
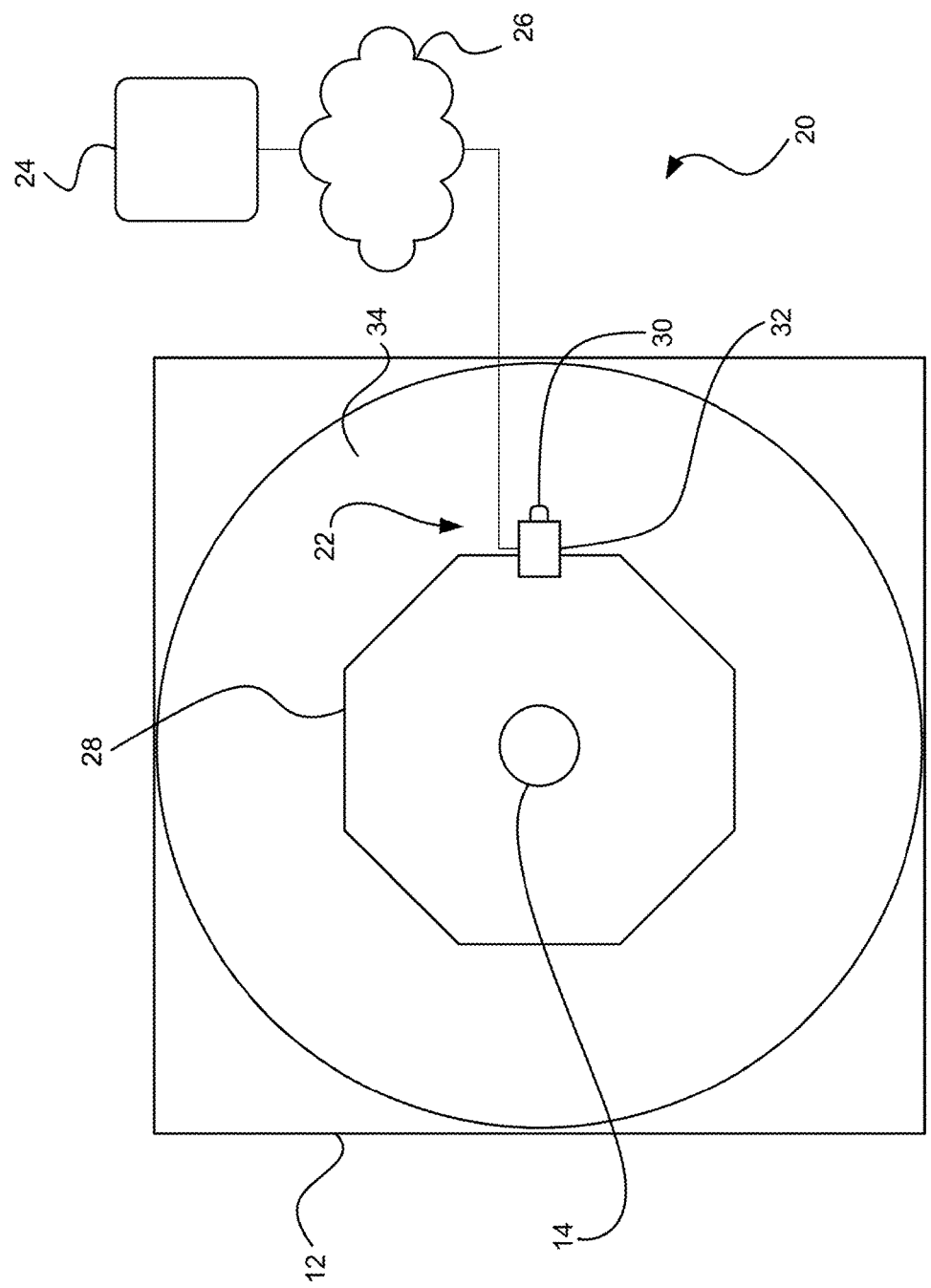
FIG. 2 is a schematic illustration of a power system and a remote locking system configured to be used in conjunction with the vehicle of FIG. 1.

FIG. 2 illustrates the locking mechanism 22 according to an embodiment. The locking mechanism 22 is mounted adjacent to a rotating member 28. The rotating member 28 is attached to the axle 14 operably connected for rotation by the power system 12. The rotating member 28 may be any component which rotates with the axle 14, such as a gear. For example, the rotating member 28 may be a transmission gear attached to a transmission case.

The locking mechanism 22 preferably includes a mechanical stop 30 and a control unit 32. The mechanical stop 30 is configured to selectively lock the rotating member 28 in order to stop the vehicle 10 and/or prevent movement thereof (e.g., via locking of the axle 14). The mechanical stop 30 is preferably attached to a stationary component 34 of the vehicle 10 (e.g., an engine block, transmission case, etc.) such that interlocking of the rotating member 28 and the mechanical stop 30 prevents the rotating member 28 from further rotation.

The mechanical stop 30 may be configured in any manner which allows for locking of the rotating component 28 and/or stopping of the power system 12 or axle 14. In an exemplary embodiment, the mechanical stop 30 is configured to deform the rotating component 28 such that the locking of the axle 14 is not easily reversible. For example, the mechanical stop 30 may breach, pierce, or embed in the rotating component 28, essentially attaching the rotating member 28 to the stationary component 34. The mechanical stop 30 may be configured as an explosive pin, parking pawl, movable latch, or the like in order to allow for selective control to stop and/or lock the movement of vehicle 10.

The control unit 32 is preferably a computing component including, for example, a processor and a memory. The control unit 32 is operably connected to the mechanical stop 30 and configured to cause movement of the mechanical stop 30. For example, the control unit 32 may transmit a signal to an electronically-controllable component, such as a latch, spring, magnetic component, or the like, which causes movement of the mechanical stop 30. The control unit 32 is operably connected to the control station 24 by the network 26 for wireless communication therebetween. In an exemplary embodiment, the control unit 32 is dedicated to actuating the mechanical stop 30. For example, the control unit 32 is preferably only capable of communicating with the control station 24 and actuating the mechanical stop 30, and is not electrically connected or in communication with any other components on the vehicle 10.

FIGS. 3A-3B illustrate a side view of the locking mechanism 22. In this embodiment, the mechanical stop 30 includes a linear-movable pin 36. The pin 36 is operably connected to the control unit 32 such that the control unit 32 can cause linear movement of the pin 36. FIG. 3A illustrates the locking mechanism 22 in an unlocked position. FIG. 3B illustrates the locking mechanism 22 in a locked position, after the control unit 32 has actuated the pin 36 (e.g., via a signal received from the control station 24). In an exemplary embodiment, the pin 36 deforms the rotating member 28 when actuated. For example, the pin 36 breaches the body of the rotating member 28, thereby locking the rotating member 28 to the stationary component 34.

The locking mechanism 22 may further include a bracket 38 on which the pin 36 is mounted. The bracket 38 may be a support member which connects the pin 36 to the stationary component 34. In an exemplary embodiment, the bracket 38 is a C-shaped channel. The rotating member 28 may rotate in the C-shaped channel such that a perimeter surface of the rotating members stays near the pin 36. When the pin 36 is actuated, it is moved linearly through the bracket 38 and into the rotating member 28, as shown in FIG. 3B.

FIG. 4 illustrates the locking system 20 including the locking mechanism 22 according to another embodiment. In this embodiment, the mechanical stop 30 includes a rotatable pawl 40. The rotatable pawl 40 is actuatable by the control unit 32 in order to rotate and contact the rotatable member 28. The rotatable pawl 40 preferably includes a point 42 which contacts the rotatable member 28, thereby locking the rotatable member 28 to the stationary component 34. In some embodiments, the rotatable pawl 40 is moved with sufficient force to pierce the body of the rotatable member 28, thereby embedding the point 42 into the outer perimeter of the rotatable member 28.

It should be understood that the illustrated embodiments are exemplary and that other configurations in which a mechanical stop attaches a rotating member to a stationary component are possible. The disclosed embodiments are applicable to stop any component of a vehicle which contributes to the vehicle being moved. The disclosed locking mechanism is particularly applicable to an autonomous vehicle which may be susceptible to entering an uncontrolled or overridden state.

The disclosed embodiments provide a locking system which may be used to remotely stop and/or lock a vehicle from unwanted motion. This unwanted motion may be the result of a malfunctioning computing system (e.g., autonomous control) and/or through a theft. The theft may include third-party overriding of the electronic control system. The locking mechanism is separate from and not controllable by the electronic control system such that it cannot be overridden and a runaway vehicle can be reliably stopped when necessary. Moreover, the locking mechanism may deform a rotatable member of the vehicle such that the locking process is not easily reversible.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A locking system for a vehicle, comprising:
    a locking mechanism operably connected to an axle of the vehicle, the locking mechanism being selectively actuatable to prevent a power system from rotating the axle; and
    a control station connected to the locking mechanism through a wireless network and configured to remotely actuate the locking mechanism,
    wherein the locking mechanism includes:
        a rotatable member attached to the axle;
        a stationary member attached to the vehicle;
        a bracket including a C-shaped channel that accommodates a portion of the rotatable member such that a perimeter surface of the portion of the rotatable member is within the C-shaped channel, wherein the bracket has a first side attached to the stationary member;
        a controller attached to a second side of the bracket; and
        a pin controllable by the controller to extend through the second side of the bracket to penetrate and deform the rotatable member to prevent rotation of the axle by locking the rotating member to the stationary member,
    wherein the power system is autonomously controlled by an electronic control system and the controller that controls the pin independent from the electronic control system.

2. The locking system of claim 1, wherein the controller is configured to selectively actuate the locking mechanism to prevent rotation of the axle.

3. The locking system of claim 2, wherein the controller is dedicated to actuating the pin.

4. The locking system of claim 1, wherein the controller is attached to the bracket such that a portion of the bracket is between the controller and the rotatable member.

5. A locking system for a vehicle, comprising:
    a locking mechanism mounted on a rotating member attached to an axle of the vehicle, the locking mechanism being selectively actuatable to prevent a power system from rotating the axle; and
    a control station connected to the locking mechanism through a wireless network and configured to remotely actuate the locking mechanism,
    wherein the locking mechanism is independent from and has no electrical connection or communication path to the electronic control system, and
    wherein the locking mechanism includes:
        a rotatable member attached to the axle;
        a stationary member attached to the vehicle;
        a bracket including a C-shaped channel that accommodates a portion of the rotatable member such that a perimeter surface of the portion of the rotatable member is within the C-shaped channel, wherein the bracket has a first side attached to the stationary member;
        a controller attached to a second side of the bracket; and
        a pin controllable by the controller to extend through the second side of the bracket to penetrate and deform the rotatable member to prevent rotation of the axle by locking the rotating member to the stationary member, wherein the controller is configured to selectively actuate the pin to prevent rotation of the axle.

6. The locking system of claim 5, wherein the power system is autonomously controlled by an electronic control system and the locking mechanism is independent from the electronic control system.

7. The locking system of claim 6, wherein the controller is dedicated to actuating the pin.

8. A vehicle, comprising:
    a power system including at least one of an engine or a motor configured to rotate an axle;
    at least one traction device operably connected to be rotated by rotation of the axle;
    an electronic control system configured to control the power system to autonomously drive the vehicle; and
    a locking system including a locking mechanism operably connected to the axle and being selectively actuatable to prevent the power system from rotating the axle;
    wherein the locking mechanism includes:
        a rotatable member attached to the axle;
        a stationary member attached to the vehicle;
        a bracket including a C-shaped channel that accommodates a portion of the rotatable member such that a perimeter surface of the portion of the rotatable member is within the C-shaped channel, wherein the bracket has a first side attached to the stationary member;
        a controller attached to a second side of the bracket; and
        a pin controllable by the controller to extend through the second side of the bracket to penetrate and deform the rotatable member to prevent rotation of the axle by locking the rotating member to the stationary member,
    wherein the power system is autonomously controlled by an electronic control system and wherein the locking mechanism is independent from and has no electrical connection or communication path to the electronic control system.

9. The vehicle of claim 8, wherein the controller is configured to selectively actuate the locking mechanism to prevent rotation of the axle.

10. The vehicle of claim 9, wherein the controller is dedicated to actuating the locking mechanism.

11. The vehicle of claim 9, wherein the controller is configured to connect with a control station configured to actuate the locking mechanism via a wireless network.

12. The vehicle of claim 11, wherein the controller communicates with only the control station.

\* \* \* \* \*